US011208760B2

(12) United States Patent
Keranen

(10) Patent No.: US 11,208,760 B2
(45) Date of Patent: Dec. 28, 2021

(54) DYED FIBERS AND METHODS OF DYEING USING O,O'-DIACETYL LEUCOINDIGO

(71) Applicant: Stony Creek Colors, Inc., Goodlettsville, TN (US)

(72) Inventor: Mark D. Keranen, Gainesville, FL (US)

(73) Assignee: Stony Creek Colors, Inc., Goodlettsville, TN (US)

( * ) Notice: Subject to any disclaimer, the term of this patent is extended or adjusted under 35 U.S.C. 154(b) by 0 days.

(21) Appl. No.: 16/770,471

(22) PCT Filed: Dec. 6, 2018

(86) PCT No.: PCT/US2018/064223
§ 371 (c)(1),
(2) Date: Jun. 5, 2020

(87) PCT Pub. No.: WO2019/113297
PCT Pub. Date: Jun. 13, 2019

(65) Prior Publication Data
US 2020/0370239 A1 Nov. 26, 2020

Related U.S. Application Data

(60) Provisional application No. 62/595,834, filed on Dec. 7, 2017.

(51) Int. Cl.
*D06P 1/22* (2006.01)
*C09B 7/02* (2006.01)

(52) U.S. Cl.
CPC ............... *D06P 1/228* (2013.01); *C09B 7/02* (2013.01)

(58) Field of Classification Search
CPC .......... D06P 1/228; D06P 1/0016; D06P 1/22; C09B 7/02
USPC ........................................................ 8/653
See application file for complete search history.

(56) References Cited

U.S. PATENT DOCUMENTS

| 3,595,657 | A | 7/1971 | Robinson et al. |
| 3,595,659 | A | 7/1971 | Gerlach et al. |
| 1,004,572 | A | 1/1977 | Nathan et al. |
| 1,004,573 | A | 1/1977 | Frieling et al. |
| 1,078,229 | A | 3/1978 | Swanson et al. |
| 1,288,861 | A | 9/1981 | Swainson et al. |
| 1,449,516 | A | 5/1984 | Kitao et al. |
| 1,459,682 | A | 7/1984 | Mossberg |
| 4,466,080 | A | 8/1984 | Swainson et al. |
| 1,471,470 | A | 9/1984 | Swainson et al. |
| 1,497,724 | A | 2/1985 | Kitao et al. |
| 5,586,992 | A | 12/1996 | Schnitzer et al. |
| 5,888,254 | A | 3/1999 | Gang et al. |
| 6,428,581 | B1 | 8/2002 | Gang et al. |
| 10,655,273 | B2 | 5/2020 | Keranen |
| 2009/0226948 | A1* | 9/2009 | Reichert ............ C12Q 1/25 435/19 |
| 2009/0265867 | A1* | 10/2009 | Ronchi ............ D06P 1/228 8/477 |

FOREIGN PATENT DOCUMENTS

| CA | 1066223 A | 11/1979 |
| CA | 1080849 A | 7/1980 |
| DE | 448909 C | 8/1927 |
| DE | 4227507 A1 | 2/1994 |
| EP | 0085392 A2 | 8/1983 |
| EP | 0094195 B1 | 2/1986 |
| GB | 186057 | 2/1924 |
| WO | 9623841 | 8/1996 |
| WO | 2012/127502 A1 | 9/2012 |
| WO | 2014/174114 A2 | 10/2014 |
| WO | 2017/223369 A1 | 12/2017 |

OTHER PUBLICATIONS

STIC Search Report dated Feb. 22, 2021.*
English translation of the DE 448909 dated Aug. 13, 1927 (Recited in the IDS in the US copending U.S. Appl. No. 16/023,652).*
C. Liebermann et al., About Acetylindingweiss and Acetylindigo, GDCh Chemische Berichte, 1891, pp. 4130-4136 (7 pages of Official Copy and 1 page of English Summary Enclosed).
Falk et al., "The Stereochemistry of Indigo. Preliminary Communication," Journal of The American Chemical Society, 1907, vol. 29, Issue 12, pp. 1739-1744.
Von G. Engi, About new derivatives of the indigo and other indigoider colorings, Angewandte Chemie International Edition, 1914, vol. 27, Issue 20, pp. 144-148 (English Copy Not Available).
D. Vorländeret al, "About Diacetyl-indigo", European Journal of Inorganic Chemistry, vol. 52, Issue 2, 1919, p. 325.
Theodor Posner, "Contributions to the knowledge of the Indigo-Gruppe, VI.: About the effect of acid chloride on indigo and Indigo-Derivate, as well as about the space formula of the indigo", European Journal of Inorganic Chemistry, vol. 59, Issue 8, 1926, pp. 1799-1827 (English Copy Not Available).
Blanc et al,. "A Procedure for Determining the Absorption Spectra of Mixed Photochromic Isomers Not Requiring Their Separation", The Journal of Physical Chemistry, vol. 72, No. 8, 1968, pp. 2817-2824.
H. Goerner et al, "Laser flash studies of thioindigo and indigo dyes. Evidence for a trans configuration of the triplet state", Chemical Physics Letters, vol. 66, Issue 2, 1979, pp. 363-369.

(Continued)

*Primary Examiner* — Eisa B Elhilo
(74) *Attorney, Agent, or Firm* — Kagan Binder, PLLC

(57) ABSTRACT

Described herein are compositions including O,O'-diacetyl leucoindigo. Also described herein are methods of pre-dyeing fibers with O,O'-diacetyl leucoindigo, followed by developing the pre-dyed fibers using hydrolysis or oxidation conditions to form indigo-dyed fibers. Also disclosed are indigo-dyed fibers, textiles, and fabrics made using O,O'-diacetyl leucoindigo, wherein cellulose, polyester, polyacrylonitrile, nylon, wool, and other compositional fiber types are suitably dyed with indigo dye using the described compositions and methods.

20 Claims, No Drawings

(56) References Cited

OTHER PUBLICATIONS

H. D. Breuer et al., "Photoacoustic study of the photochemistry of adsorbed indigoid dyes", Applied Optics, vol. 21, Issue 1, 1982, pp. 41-43.
Lee et al., "Homogeneous and Heterogeneous Photocatalysis", Series C: Mathematical and Physical Sciences vol. 147, 1986, 25 pages.
Helmut Görner et al, "Trans to cis photoisomerization of N,N'-disubstituted indigo dyes via excited singlet states; a laser flash photolysis and steady state irradiation study", Canadian Journal of Chemistry, vol. 65, No. 4, 1987, pp. 708-717.
Douglas et al, "Substituent and Solvent Effects on the Thermal Isomerisation of 7HPyrazolo [5,1 -c]-1 ,2,4-triazole Azomethine Dyes", Journal of the Chemical Society, Perkin Transactions 2, 1991, pp. 1363-1367.
Smith et al,"[ 1,3] Alkyl Migration as a Third Type of N,N'-Dialkanoylindigo Photochemistry", The Journal of Organic Chemistry, vol. 58, No. 23, 1993, pp. 6493-6496.
R.W. Sinkeldam, "Foldamers and Chromophores" (Dutch PhD. thesis, Technische Universiteit Eindhoven), 2006, 148 pages.
Porada et al, "Planar and distorted indigo as the core motif in novel chromophoric liquid crystals", New Journal of Chemistry, vol. 39, pp. 8291-8301, 2015.
Kolaczkowski et al., "Stepwise Bay Annulation of Indigo for the Synthesis of Desymmetrized Electron Acceptors and Donor-Acceptor Constructs", Organic Letters, vol. 18, pp. 5224-5227, 2016.
Clyde B. Anderson, "Dyeing Reactive Dues Using Less Salt", American Dyesrtuff Reporler, Sep. 1994, pp. 103-105.
Liebermann et al., "Acetyl Indigo White and Acetyl Indigo," Journal of the Society of Dyers and Colourists, 1892, vol. 8, p. 93.
Falk et al., "The Stereochemistry of Indigo," Journal of the American Chemical Society, 1907, vol. 30, p. 143.
International Search Report for Application No. PCT/US2018/040279, dated Oct. 15, 2018, 5 pages.
Written Opinion for Application No. PCT/US2018/040279, dated Oct. 15, 2018, 8 pages.
International Search Report for International Application No. PCT/US18/64223, dated Feb. 15, 2019, 4 pages.
Written Opinion for International Application No. PCT/US18/64223, dated Feb. 15, 2019, 5 pages.
Setsune et al., "Synthesis of N,N'-Diacylindigotins (N,N'-Diacyl-2,2'-bi-indolinylidene-3,3'-diones) via an Oxidative Oxygen-to-Nitrogen Acyl Shift of O,O'-Diacyl-leucoindigos (3,3'-Diacyloxy-2,2'-bi-indolyls)", Journal of the Chemical Sociely-Perkin Transactions, Issue 10, 1984, pp. 2305-2309.
Setsune et al., "Synthesis and cis-to-trans Isomerization of N,N'-Diacyl Derivatives of Indigotin", Journal of the Chemical Society-Chemicaf Communications, Issue 17, 1982, pp. 1022-1023.

\* cited by examiner

DYED FIBERS AND METHODS OF DYEING USING O,O'-DIACETYL LEUCOINDIGO

CROSS-REFERENCE TO RELATED APPLICATIONS

This application claims priority to International Application No. PCT/US2018/064223, filed Dec. 6, 2018, which claims the benefit of U.S. provisional application No. 62/595,834, filed Dec. 7, 2017, wherein the contents of said applications are incorporated herein by reference in their entireties.

BACKGROUND

Indigo is a blue dye that has been used to dye cloth for thousands of years. The chemical formula of indigo is $C_{16}H_{10}N_2O_2$ and its IUPAC name is (2E)-2-(3-oxo-1H-indol-2-ylidene)-1H-indol-3-one.

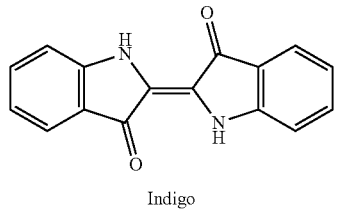 [SMILES: O=C1/C(=C2\Nc3ccccc3C2=O)Nc2ccccc21]

Indigo

Indigo is water-insoluble and therefore must first be reduced (vatted) to the water-soluble leuco form, also referred to as leucoindigo or "indigo white", before it can be applied onto fabric.

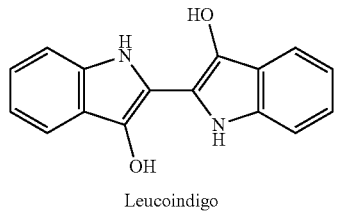 [SMILES: Oc1c(-c2[nH]c3ccccc3c2O)[nH]c2ccccc12]

Leucoindigo

The conventionally developed indigo dyeing process involved immersing cotton fibers in an alkaline dye bath containing reduced (vatted) indigo. The indigo is reduced in an alkali medium in a vessel using inorganic reducing agents such as sodium dithionite and thiourea dioxide or organic reducing agents such as hydroxyacetone. Upon removing the fabric from the dye bath, leucoindigo quickly oxidizes, reverting to the insoluble, intensely colored indigo.

The disadvantage of using a vat dye such as indigo is the high concentration of reducing agents required and the resultant pollution of the wastewaters generated in the dyeing process, as well as the time necessary to reduce the indigo under conventional vat dyeing processes. Further the types of fiber and fabric substrates that can be successfully dyed with indigo are limited.

The first laboratory synthesis of indigo was reported in 1878. By 1897, a commercially feasible manufacturing process was developed that largely replaced the use of naturally-sourced indigo. Synthetic indigo is primarily produced from petroleum derivative, benzene and other undesirable starting reagents such as formaldehyde, sodium cyanide, sodamide, and the like.

In recent years, there has been renewed interest to return to natural sources of colorants and to reduce consumption of petrochemicals, as well as address water pollution from textile dyeing. While a number of methods have been explored or used to make indigo more user and environmentally friendly, such as adding a pair of sulfonate functional groups to make indigo disulfonic acid (aka indigo carmine, Saxon blue, Acid Blue 74, FD&C Blue No. 2), these modification strategies change the makeup of the compound and alter the color and physical characteristics of the dye. These changes make modified indigos such as indigo carmine inappropriate for use with particular fibers or textiles, for example in cotton, the primary fiber in denim. As a result, there is also a renewed need for fiber or fabric dyeing methodologies that are useful in conjunction with naturally extracted plant-based colorants such as indigo.

SUMMARY

Described herein are compositions, uses, methods of making and using an O,O'-diacetyl leucoindigo. O,O'-diacetyl leucoindigo is represented by the following formula:

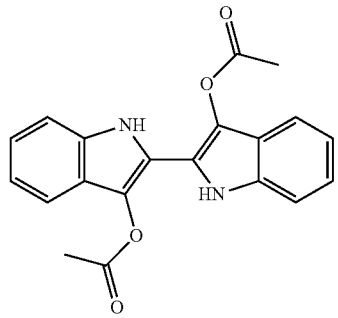 [SMILES: CC(=O)Oc1c(-c2[nH]c3ccccc3c2OC(C)=O)[nH]c2ccccc12]

In some embodiments, O,O'-diacetyl leucoindigo is obtained from indigo as an air-stable off white, grey, tan or sandy-colored solid. In some embodiments, O,O'-diacetyl leucoindigo is used as a dye to affix indigo onto both natural and synthetic fibers without the need for reducing agents or minimal reducing agents and known vat conditions. Such an embodiment offers significant improvement over conventional indigo dyeing methods in that the methods described herein eliminate or minimize the use of reducing agents, thereby avoiding or reducing pollutant problems associated with breakdown of reducing agents in the wastewater in the dyeing process. In other embodiments, O,O'-diacetyl leucoindigo is used to replace the conventionally reduced indigo (leucoindigo), thereby eliminating problems associated with vatting such as handling reducing agents, controlling the reduction process, and managing the reaction by-products such as hydrogen sulfide. The O,O'diacetyl leucoindigo also lends itself to use in package, garment dye, or other dyeing operations in addition to conventional denim yarn rope range or slasher dye range as a new way to dye cellulosic and protein-based yarns, without the need for reducing agents.

Advantageously and unexpectedly, methods and compositions described herein enable dyeing of an expanded range of fibers, including synthetic fibers.

In one aspect of the invention is a method of dyeing a fiber, the method comprising:
  (a) contacting the fiber with a dye bath to form a pre-dyed fiber, the dye bath comprising O,O'-diacetyl leucoindigo; and
  (b) developing the pre-dyed fiber to form a dyed fiber.

In another aspect of the invention is a pre-dyed fiber comprising a fiber and O,O-diacetyl leucoindigo.

In yet another aspect of the invention is use of O,O'-diacetyl leucoindigo to dye a fiber with indigo dye. In some aspects, the fiber is hair or textile fibers.

In still another aspect of the invention is a kit for dyeing fiber, the kit comprising O,O'-diacetyl leucoindigo in substantially solid form; and directions for dyeing a fiber using the O,O'-diacetyl leucoindigo.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, "dye", "dyeing" and like terms refer generally to a process of affixing O,O'-diacetyl leucoindigo to a fiber or textile. A colorant is considered to be "affixed to a fiber" or textile when the colorant is not substantially removed by washing the fiber with water, as determined by colorimetric measurement or by visual confirmation such as observation of no color in wash water used to wash a dyed fiber or textile. Rub fastness, a characteristic of indigo dyeing, does not indicate that the dye is affixed to the fiber.

As used herein, the term "developing," "development," or any appropriate grammatical equivalent means removal of the acetyl groups on O,O'-diacetyl leucoindigo to form the indigo pigment.

As used herein, the term "dye bath" means O,O'-diacetyl leucoindigo with either an organic solvent or an aqueous alkaline solution, unless otherwise specified or determined by context.

As used herein, the term "dye bath ratio" means the volume of a dye bath in liters, divided by the mass of a fiber or a textile to be dyed in kilograms. For example, 5 liters of a 1 mole/liter dye bath used to dye 1 kg of a textile obtains a dye bath ratio of 5:1.

As used herein, the term "leucoindigo" means indigo (IUPAC: (2E)-2-(3-oxo-1H-indol-2-ylidene)-1H-indol-3-one) in a chemically reduced form, as either the leucoindigo acid form, the monoenolate form, or the bienolate form or combinations thereof as represented by the structures:

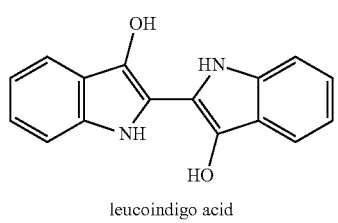

leucoindigo acid

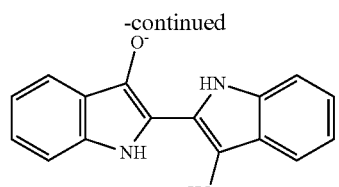

monoenolate form

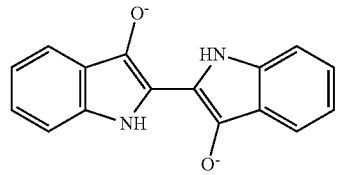

bienolate form

As used herein, the term "O,O'-diacetyl leucoindigo" means the compound represented by the formula:

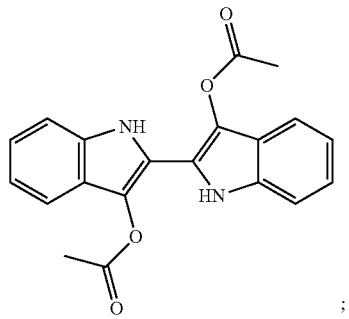 [SMILES: CC(=O)Oc1c(-c2[nH]c3ccccc3c2OC(C)=O)[nH]c2ccccc12]

as specified or as determined by context, the term "O,O'-diacetyl leucoindigo" may refer to an associative structure, derivative, product of an inter- or intramolecular reaction residue, or analog of O,O'-diacetyl leucoindigo that is formed during or as a result of a dyeing process.

As used herein, the term "pre-reduced indigo" means a dye preparation containing leucoindigo and a chemical reducing agent, dispersant, pH control, and/or anti-oxidizing agents.

As used herein, the term "fiber" means a generally cylindrical solid article having a diameter, at any selected location along the cylinder length, of about 0.1 micrometer (0.1 µm, or 100 nm) to 1 millimeter (1 mm), further wherein an aspect ratio is greater than or equal to 100:1 length:diameter, and wherein the aspect ratio may be as high as $10^8$:1. In some embodiments, the fiber is a textile fiber, as specified or determined by context. In some embodiments, the fiber is a natural fiber. In some embodiments, the fiber is hair fiber.

As used herein, the term "textile fiber" means a fiber that is a discrete portion of a textile.

As used herein, the term "textile" means an assembly comprising or consisting essentially of a plurality of contacted textile fibers. In some embodiments, the contacted textile fibers of the assembly have the same or substantially the same chemical composition. In some embodiments, the assembly is spun or bundled, such as in a thread or yarn; in other embodiments the assembly is a fabric (or "textile fabric"), such as in a woven or nonwoven fabric. In some embodiments, the assembly is a portion of a larger construction, such as a yarn or a thread looped through a backing or mat to provide a cut-pile or closed-loop type rug or carpet assembly, or a related fabric configuration.

As used herein, the term "fabric" means a substantially two-dimensional web type woven or nonwoven textile. Fabric may be referred to as a "cloth" or the like, as specified or determined by context.

As used herein, the term "woven" as applied to a textile means that the plurality of textile fibers are assembled into a fabric by a weaving process.

As used herein, the term "nonwoven" as applied to a textile means that the plurality of textile fibers are assembled into a fabric by a process other than weaving. Such processes include but are not limited to felting, knitting, melt blowing, solvent spinning, electrospinning, spunbonding, stitchbonding, and the like as well as combinations of these processes.

As used herein, the terms "color", "color space", L*a*b*, and similar terms refer to CIELAB color space and methods of colorimetric measurements thereof. CIELAB color space is a three dimensional representation of color visible to the average human eye, defined as luminance (L axis), having white at one extreme and black at the other; red-green (a axis), varying from red (+a) at one axis end to green (−a) at the other; and yellow-blue (b axis), varying from yellow (+b) at one axis end to blue (−b) at the other. In some embodiments, the color space is measured by comparison to a standard, such as the d50 standard, to provide a uniform value of white (255, 0, 0). An approximation of the hues defined by a recitation of L*, a*, and b* values may be observed with reference to a color space guide such as that available for download at: www.cmykguide.com/pdf/1.%20CMYK%20GUIDE%20%20CIE%20Lab%20color%20space.pdf As used herein, the term "natural" in reference to a fiber source or a textile source refers to fibers or textiles obtained from plants or animals. In mixtures of materials, a fiber or textile is considered to be "naturally sourced" if at least 50% by weight of a fiber or textile is obtained from plants or animals. A naturally sourced fiber or textile may be subjected to one or more chemical or mechanical treatments prior to a dyeing process.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes as a subset thereof "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Discussion

Described herein are compositions and methods of use comprising O,O'-diacetyl leucoindigo. In some embodiments, O,O'-diacetyl leucoindigo is storage stable in air under ambient indoor conditions, and without taking any special steps to stabilize the compound. In some embodiments, O,O'-diacetyl leucoindigo and compositions comprising O,O'-diacetyl leucoindigo are stable when exposed to conditions of air, heat, light, water, and acids. In some embodiments, compositions comprising, consisting essentially of, or consisting of O,O'-diacetyl leucoindigo include the same or substantially the same O,O'-diacetyl leucoindigo content before and after exposure to heat, light, water, air, acid, or a combination thereof. After application of O,O'-diacetyl leucoindigo to one or more fibers using mild conditions, development of the O,O'-diacetyl leucoindigo to form indigo is carried out using mild conditions of oxidation, hydrolysis, or a combination thereof, to result in an indigo-dyed fiber. Such fibers include an amount of indigo sufficient to impart a characteristic range of blue color associated with indigo dye. The stability of O,O'-diacetyl leucoindigo during storage and use, combined with mild conditions employed to trigger development of indigo in situ, makes O,O'-diacetyl leucoindigo highly advantageous as a replacement for leucoindigo in one or more industrial fiber dyeing processes and offers many advantages over processes involving leucoindigo.

In some embodiments, O,O'-diacetyl leucoindigo is used to form indigo dyed fibers using fiber compositions and materials that at the present time cannot be used for indigo dyeing using leucoindigo, or cannot be used for indigo dyeing on an industrial scale. By using compositions and methods comprising O,O'-diacetyl leucoindigo, a range of fiber materials and fiber types are suitably dyed with indigo to result in dyed fibers having indigo color ranges. The indigo dyed fibers and fabrics are formed from fibers comprising O,O'-diacetyl leucoindigo and exhibit traditional characteristics of indigo both in terms of appearance and performance such as crocking (the physical rubbing off of indigo from fabric to another surface), rub fastness, and wash fastness.

In some embodiments, O,O'-diacetyl leucoindigo is used in one or more conventional indigo dyeing processes, yet with a reduced amount of reducing agents compared to the amount of reducing agents used in conventional leucoindigo dyeing processes. In some embodiments O,O'-diacetyl leucoindigo is used in a dyeing process wherein reducing agents (including but not limited to inorganic reducing agents such as sodium dithionite and thiourea dioxide or organic reducing agents such as hydroxyacetone) are excluded or substantially excluded. In some embodiments a dye bath comprising, consisting essentially of, or consisting of a solution or dispersion of O,O'-diacetyl leucoindigo is employed to dye a fiber, wherein the dyed fiber is subsequently "developed" by hydrolysis or oxidation to convert the O,O'-diacetyl leucoindigo to indigo thereby forming an indigo-dyed fiber. In some embodiments the dye bath comprises, consists essentially of, or consists of an alkanol solution of O,O'-diacetyl leucoindigo. Such processes solve severe technical problems associated with conventional leucoindigo dyeing processes, specifically by eliminating, substantially eliminating, or decreasing the use of reducing agents; and/or by eliminating, substantially eliminating, or decreasing the need to address contaminants in spent dye liquors and other wastewater products associated with the alkaline reducing solutions employed in leucoindigo dyeing processes.

In some embodiments, O,O'-diacetyl leucoindigo is applied to one or more of cellulose and polyester at room temperature. In some embodiments, O,O'-diacetyl leucoindigo is applied to one or more of wool and polyamides. Conventionally, wool and polyamides are difficult to dye because these materials require a narrow pH range for dyeing, which exclude the pH range required for indigo dyeing.

In some embodiments, O,O'-diacetyl leucoindigo is applied to one or more of hair fibers. In some embodiments, hair fibers are human hair, animal fur, bristles, feathers, wool and the like.

Vat dyes are a large class of dyes that are conventionally applied to textile fibers in chemically reduced forms, which are water soluble. In conventional indigo vat dyeing processes, indigo dye is reduced to water soluble leucoindigo using a suitable reducing agent in aqueous alkaline solution. In some cases, the concentration of oxygen gas dissolved in the leucoindigo bath or near the air-bath interface must also be reduced (compared to ambient concentrations) by blanketing the surface of the bath or sparging the bath with nitrogen gas or another inert gas or mixture thereof. Then the fiber, textile, or fabric is exposed to the leucoindigo bath to disperse the leucoindigo within the fibers, on one or more surfaces thereof, or both. Then the leucoindigo is oxidized (conventionally by exposing to air or oxygen, e.g., by a peroxide bath) so that the reduced dye is oxidized to indigo. Upon oxidation, the indigo dye exhibits the desired colors, on the fiber, depending on the materials and process used.

It is well understood by those of skill in the art that even in the water soluble leucoindigo form, indigo has a low affinity for textile materials. Therefore, the conventional vat dyeing cycles are often repeated as needed to obtain the desired shade of blue, with five to seven leucoindigo immersions conventionally being used, and with each of these immersions being followed by oxidation of the deposited leucoindigo.

The ability to provide a stabilized reduced leuco-form of indigo has been a goal of indigo research for decades due to the high cost of the foregoing processes, the need to use harsh chemicals and special conditions over multiple steps, known issues with inconsistencies in the indigo reduction process that can occur without an excess of reducing chemicals, waste and pollutants that arise from the conventional indigo dyeing process, such as large amounts of water used, and use of specialized equipment. For example, the O,O'-disulfate ester leuco-form of indigo is known to be stable and water soluble. However, the O,O-disulfate ester form is costly to produce and has low affinity for cellulosic materials, resulting in light to medium shades only. Further, the O,O'-disulfate ester is sensitive to water, light, heat, and acids. Some applications require the use of external oxidizing agents such as dichromate in order to achieve conversion to indigo in the final step.

In some embodiments, O,O'-diacetyl leucoindigo has higher affinity for cellulose than the leucoindigo sulfate ester, allowing for darker shades to be obtained.

O,O'-diacetyl leucoindigo also provides important benefits over so-called "pre-reduced" forms of indigo. Pre-reduced indigos are reported e.g. in U.S. Pat. No. 6,428,581 B1, which reports 25-55% by weight leucoindigo; and European patent application EP0807146, which reports reduced indigo crystals. The pre-reduced indigo allows the user to employ relatively mild vat conditions, e.g. using sodium carbonate instead of sodium hydroxide to form the aqueous alkaline dye bath. But the pre-reduced indigo is still not stable to air exposure and readily oxidizes upon exposure to air. Therefore, these products must be packed and shipped employing specialized conditions, for example: in alkaline solution, under inert gas headspace, in granule form with alkali metal hydroxides, in reducing conditions such as encapsulated in reducing sugars (e.g. molasses), or any combination of these. The pre-reduced form still requires front-end input of reducing agents when employed in a vat, albeit in smaller amounts than required using conventional indigo dyeing processes.

In some embodiments, O,O'-diacetyl leucoindigo is easily synthesized in good yield using standard reagents, and so is inexpensive to produce. In some embodiments, O,O'-diacetyl leucoindigo is stored, shipped, and handled without special packaging and without taking any special precautions to exclude oxygen. In some embodiments, O,O'-diacetyl leucoindigo is storage stable when exposed to heat, light, water, and acid. As such, O,O'-diacetyl leucoindigo provides an important advantage over pre-reduced indigos by eliminating the need for specialized storage, shipping, and handling.

Preparation of O,O'-Diacetyl Leucoindigo

In some embodiments, O,O'-diacetyl leucoindigo is prepared by reducing indigo with zinc in the presence of acetic anhydride. In other embodiments O,O'-diacetyl leucoindigo is prepared by reducing indigo with zinc in sodium acetate. In some embodiments, O,O'-diacetyl leucoindigo is prepared by combining indigo and zinc powder or dust in acetic anhydride to form a reaction mixture; and agitating the reaction mixture at a temperature of about 18° C. to 40° C., or about 20° C. to 30° C., for a reaction period of about 5 hours to 20 hours. In some embodiments, indigo and zinc are present in the reaction mixture at a weight ratio of about 2:1 to 1:2, about 3:2 to 2:3, or about 1:1. In some embodiments, the acetic anhydride is present in the reaction mixture in an amount reflecting at least 2 moles of acetic anhydride per mole of indigo; in some such embodiments the acetic anhydride is present in the reaction mixture in a large excess, such that acetic anhydride functions as a solvent in the reaction mixture.

In some embodiments, the reaction mixture is washed after the reaction period. In some embodiments, the washing comprises acid washing. In some embodiments, acid washing is carried out by combining the reaction mixture with water and an acid to form an acidified reaction mixture, and agitating the acidified reaction mixture for about 15 minutes to 60 minutes, or 30 minutes to 45 minutes, or 15 minutes to 30 minutes. In some embodiments, the acid is a strong Brønsted acid. In some embodiments the acid is HCl. In some embodiments, the pH of the acidified reaction mixture is about 2 to about 6.9, or about 3 to 6. In some embodiments, after the agitating, the acidified reaction mixture is filtered to obtain a filtrate; in other embodiments a solid particulate is separated from the acidified reaction mixture by some other method, such as cyclonic action. All such separations are understood to obtain a "filtrate" for discussion purposes herein. In some embodiments the filtrate is washed one or more times with water. In some embodiments the filtrate is dried to provide O,O'-diacetyl leucoindigo as an off-white or tan powder. In some embodiments, the filtrate comprises, consists essentially of, or consists of O,O'-diacetyl leucoindigo. In some embodiments the yield of O,O'-diacetyl leucoindigo obtained is about 80 mol % to 100 mol %, or about 85 mol % to 99 mol %, or about 90 mol % to 99 mol % based on moles of indigo added to the reaction mixture.

One embodiment of a reaction process to form O,O'-diacetyl leucoindigo from indigo is described in Example 1.

The solid O,O'-diacetyl leucoindigo is stable in the presence of air, light, and acids, and is soluble in lower alkanols such as methanol, ethanol, and isopropanol. The O,O'-diacetyl leucoindigo is shelf stable both in solid or substantially 100% solid form, and in both concentrated and dilute ethanol solution when stored, transported, and handled under common ambient laboratory or manufacturing facility conditions of atmosphere and temperature.

Accordingly, disclosed herein is an O,O'-diacetyl leucoindigo concentrate, the concentrate comprising, consisting essentially of, or consisting of O,O'-diacetyl leucoindigo and one or more solvents, wherein the concentrate is flowable, pourable, or pumpable under conventional laboratory or manufacturing conditions of about 15° C. to 30° C. and standard atmospheric composition and pressure. In some embodiments, the concentrate comprises, consists essentially of, or consists of one or more solvents and about 5 wt % to 80 wt % O,O'-diacetyl leucoindigo based on the weight of the concentrate, for example about 10 wt % to 80 wt %, or about 15 wt % to 80 wt %, or about 20 wt % to 80 wt %, or about 25 wt % to 80 wt %, or about 30 wt % to 80 wt %, or about 35 wt % to 80 wt %, or about 40 wt % to 80 wt %, or about 45 wt % to 80 wt %, or about 50 wt % to 80 wt %, or about 5 wt % to 75 wt %, or about 5 wt % to 70 wt %, or about 5 wt % to 65 wt %, or about 5 wt % to 60 wt %, or about 5 wt % to 55 wt %, or about 5 wt % to 50 wt %, or about 5 wt % to 45 wt %, or about 5 wt % to 40 wt %, or about 5 wt % to 35 wt %, or about 5 wt % to 30 wt %, or about 5 wt % to 25 wt %, or about 10 wt % to 70 wt %, or about 15 wt % to 60 wt %, or about 20 wt % to 50 wt %, or about 25 wt % to 50 wt % O,O'-diacetyl leucoindigo based on the weight of the concentrate. In some embodiments, the concentrate is a solution. In some embodiments the concentrate is a dispersion. In some embodiments, the concentrate is an emulsion and further comprises one or more surfactants. In some embodiments the concentrate comprises, consists essentially of, or consists of an alkanol solution of O,O'-diacetyl leucoindigo. In some embodiments, the alkanol comprises, consists essentially of, or consists of ethanol.

In some embodiments the concentrate is shelf stable when stored in an enclosed container for a storage period of at least 1 month and as long as 10 years or In some embodiments longer than 10 years, such as 1 year to 20 years, 2 years to 20 years, or 5 years to 20 years. In some embodiments, the concentrate is suitably opened one or more times during a period of storage and exposed to the ambient atmosphere without any loss of O,O'-diacetyl leucoindigo. Additionally, the concentrate is suitably transported and stored in any type of conventional container that generally prevents loss of the selected solvent by evaporation or allows for replenishment of solvent upon evaporation. Suitable containers include those made from thermoplastics; glass, and metals, and combinations of two or more thereof.

In some embodiments, solid or substantially 100% solids O,O'-diacetyl leucoindigo, or a concentrate of O,O'-diacetyl leucoindigo is provided in a kit used to dye one or more fibers, textiles, or fabrics. In some embodiments, the kit further includes instructions for a user regarding one or more of: how to prepare a dye bath comprising O,O'-diacetyl leucoindigo; how to prepare a developing bath (for hydrolyzing or oxidizing O,O'-diacetyl leucoindigo to form indigo); how to dye a fiber, textile, or fabric using O,O'-diacetyl leucoindigo; and how to develop a fiber, textile, or fabric comprising O,O'-diacetyl leucoindigo to form an indigo-dyed fiber, textile, or fabric. The instructions may provide additional information such as advice on rinsing and washing dyed fibers, textiles, and fabrics; compositional types of fibers, textiles, and fabrics that are suitably addressed by the dyeing and developing using O,O'-diacetyl leucoindigo and/or specific instructions for dyeing different types of fibers; amount of O,O'-diacetyl leucoindigo needed in the dye bath to provide the desired color range; dye liquor ratios; safe handling information, and the like. In some embodiments, the kit further includes one or more components of a developing bath as will be described below, and instructions on how to make and use the developing bath formed from the kit components included. In such embodiments, the dye bath components and the developing bath components are packaged discretely.

Dyeing Process

In some embodiments, O,O'-diacetyl leucoindigo is used in one or more vat dyeing type processes. In some embodiments, O,O'-diacetyl leucoindigo is used in conjunction with one or more conventional dyeing processes comprising or consisting essentially of steps, devices, and systems associated with vat dye, package dye, garment dye, denim yarn rope range, or slasher dye range. In other embodiments, O,O'-diacetyl leucoindigo is used in an all-in process, in a continuous dyeing process, in a cold pad-batch dyeing process, in a cold exhaust dyeing process, in a warm or hot exhaust dyeing and migration exhaust process, or two or more thereof. These and other related dyeing techniques are generally described in the Kirk-Othmer Encyclopedia of Chemistry, 3rd Edition, 8:693-694 (1989).

In some embodiments, the dyeing process as described herein comprises, consists essentially of, or consists of contacting a fiber with a dye bath comprising O,O'-diacetyl leucoindigo to form a pre-dyed fiber; and developing the pre-dyed fiber to form a dyed fiber comprising indigo. In some embodiments, with regard to discussions herein the fiber is a single fiber, a single fiber included in a plurality of fibers, a textile or a plurality of textiles, a fabric, or a plurality of fabrics as selected by one of skill in dyeing fibers, textiles, and fabrics, and further as determined by context herein. The dyeing processes described herein are useful in conjunction with a range of commercial batch and continuous dyeing processes, dyeing equipment, dyeing rates, and compositional amounts and ratios of materials. As such, the type of fiber, textile, or fabric included in the dyeing process is limited solely by the user based on factors such as available equipment. Furthermore, it is a feature of the dyeing processes and compositions described herein that a broad range of textile fibers are suitably addressed to result in indigo-dyed fibers, that is, fibers comprising the compound indigo. That is, fibers excluding or substantially excluding cellulose (traditionally, cotton) are suitably dyed using the processes and compositions disclosed herein to provide indigo-dyed fibers. Conventional leucoindigo dyeing is used almost exclusively for cotton textiles and fabrics.

It will be understood further that O,O'-diacetyl leucoindigo in solid, substantially solid, or as concentrate (combined with a solvent as described above) are suitably used in the dyeing processes described herein by diluting to the desired concentration of O,O'-diacetyl leucoindigo with sufficient mixing to achieve the desired solution or dispersion suitable for the dyeing process substantially as described.

In some embodiments, the contacting to form the pre-dyed fiber is saturating the fiber with a dye bath comprising, consisting essentially of, or consisting of O,O'-diacetyl leucoindigo and a solvent. In some embodiments the contacting to form the pre-dyed fiber is immersing the fiber in a dye bath comprising O,O'-diacetyl leucoindigo and a solvent. In some embodiments the dye bath excludes or substantially excludes a reducing agent. The amount of O,O'-diacetyl leucoindigo in the dye bath is selected by the user based on the desired percent weight of dye on the fiber, or % wof, further in consideration of the particular type of fiber contacted with the dye bath and the specific conditions of dyeing employed by the user. In some exemplary but non-limiting embodiments the dye bath comprises about 1% to 50%, or about 1% to 20%, or about 1% to 10%, or about 1% to 8%, or about 1% to 6%, or about 1% to 4%, or about 1% to 2%, or about 2% to 20%, or about 4% to 20%, or about 6% to 20%, or about 8% to 20%, or about 10% to 20%, by weight of O,O'-diacetyl leucoindigo based on the total dye bath weight. In some other exemplary but non-limiting embodiments the dye bath comprises about 1% to 50%, or about 1% to 20%, or about 1% to 10%, or about 1% to 8%, or about 1% to 6%, or about 1% to 4%, or about 1% to 2%, or about 2% to 20%, or about 4% to 20%, or about 6% to 20%, or about 8% to 20%, or about 10% to 20%, by weight of O,O'-diacetyl leucoindigo based on the total dye bath volume.

The dye bath comprises, consists essentially of, or consists of O,O'-diacetyl leucoindigo and a solvent. In some embodiments, the dye bath excludes or substantially excludes a reducing agent. In some embodiments, the dye bath is prepared by dissolving or dispersing solid O,O'-diacetyl leucoindigo in the solvent. Optionally the solvent is heated, for example to a temperature of about 30° C. to 100° C., to facilitate dissolution or dispersion of the O,O'-diacetyl leucoindigo therein. In some embodiments, the solvent comprises, consists essentially of, or consists of one or more alkanols, glycols, glycol ethers, glycol esters, carbitols, hydrotropes, or mixtures thereof. In some embodiments the solvent is a water miscible solvent. In some embodiments the solvent further includes water; in some such embodiments, the dye bath further includes a nonionic surfactant. Water-miscible alkanols include C1-C6 alkanols such as ethyl alcohol, methyl alcohol, n-propyl alcohol, iso-propyl alcohol, n-butyl alcohol, and mixtures of two or more thereof. In some embodiments, the alkanol is ethanol. In some embodiments, the dye bath comprises about 99 wt % to 50 wt %, or from 99 wt % to 90 wt %, or 99 wt % to 95 wt %, or 95 wt % to 90 wt %, or 95 wt % to 60 wt %, or 95 wt % to 70 wt %, or 80 wt % to 60 wt % solvent based on the total dye bath weight. In some embodiments the dye bath comprises about 99 vol % to 50 vol %, or from 99 vol % to 90 vol %, or 99 vol % to 95 vol %, or 95 vol % to 90 vol %, or 95 vol % to 60 vol %, or 95 vol % to 70 vol %, or 80 vol % to 60 vol % solvent based on the total dye bath volume. In some embodiments, heat is added to the solvent during dissolution of O,O'-diacetyl leucoindigo, wherein sufficient heat is added to reach a temperature of about 30° to 100° C., for example 30° C. to 80° C.; 30° C. to 60° C.; 30° to 50° C.; 40° C. to 100° C., 40° C. to 80° C.; or 50° C. to 100° C.; or 50° C. to 80° C.

In some embodiments, the dye bath comprises 1 part O,O'-diacetyl leucoindigo to 2 to 1000 parts solvent, for example 1 part O,O'-diacetyl leucoindigo to about 5 to 500 parts solvent, or 1 part O,O'-diacetyl leucoindigo to about 10 to 100 parts solvent. In some embodiments, the dye bath contains 1 part O,O'-diacetyl leucoindigo to 2 to 1000 parts solvent, for example 1 part O,O'-diacetyl leucoindigo to about 5 to 500 parts solvent, or 1 part O,O'-diacetyl leucoindigo to about 10 to 100 parts solvent. In some embodiments, such ratios by parts are suitably determined on a volume basis. In other embodiments, such ratios by parts are suitably determined on a weight basis.

In some embodiments, the dye bath includes one or more additives that are adjuvants in the dyeing process. Common adjuvants are wetting agents, and surfactants as well as anti-foaming materials, antimicrobial materials, and the like. While a reducing agent may be added to the dye bath, for example to ensure stability of the O,O'-diacetyl leucoindigo during the pre-dyeing process, it is an important feature of the methods and processes described herein that reducing agents, such as those conventionally associated with indigo dyeing of cellulose fibers, are not required in any composition comprising O,O'-diacetyl leucoindigo described herein. Furthermore, it is an important feature of the methods and processes described herein that reducing agents, such as those conventionally associated with indigo dyeing of cellulose fibers, are not required in any method comprising O,O'-diacetyl leucoindigo described herein. As such, reducing agents may be excluded or substantially excluded from any of the compositions or methods described herein.

In some embodiments, the dye bath contains water or substantially water with one or more additives that include adjuvants used in the conventional dyeing process. In some embodiments where a dye bath comprising the same mixture or substantially the same mixture of surfactants, reducing agents, pH modifiers, and the like as conventionally used in dye baths prepared for pre-reduced indigo applications, O,O'-diacetyl leucoindigo is used directly as an alternative to pre-reduced indigo. In one or more such embodiments, the dye bath does not require an alkanol or other organic solvent. Because O,O'-diacetyl leucoindigo can be introduced into aqueous alkaline systems with the aid of adjuvants regularly employed in the conventional dye processes using pre-reduced indigo, In some embodiments the O,O'-diacetyl leucoindigo is suitably used in dyeing facilities that conventionally employ pre-reduced indigo. In some embodiments, the O,O'-diacetyl leucoindigo, with the use of an appropriate surfactant or dispersant, serves as a direct replacement for pre-reduced indigo. However, O,O'-diacetyl leucoindigo provides a substantial benefit over pre-reduced indigo compositions in such applications because O,O'-diacetyl leucoindigo is a stable, solid form for introduction into a vat or other dyeing apparatus. In some embodiments, a dye bath comprises, consists essentially of, or consists of O,O'-diacetyl leucoindigo and water having an alkaline pH. In some embodiments the dye bath further includes a dispersant or surfactant.

In some embodiments, contacting the fiber with the dye bath is carried out by immersing or saturating the fiber or fabric in the dye bath, or by impregnating, spraying, foaming, coating, padding, or any suitable technique to introduce the dye bath into the fiber or fabric. In some embodiments, the ratio of dye bath weight:fiber weight is about 1:1 to 100:1, for example about 1:1 to 50:1, or 2:1 to 50:1, or 5:1 to 50:1, or 10:1 to 50:1, or 20:1 to 50:1, or 30:1 to 50:1, or 40:1 to 50:1, or 1:1 to 40:1, or 1:1 to 30:1, or 1:1 to 20:1, or 1:1 to 10:1, or 1:1 to 7:1, or 1:1 to 5:1, or 1:1 to 2:1. In some embodiments, the contacting is for a dyeing contact period of at least about 1 second. One of skill in the art understands that the dyeing contact period can be determined depending upon of the surface area and physical characteristics of the fiber or fabric to be dyed and method of contacting the fiber with the dye bath. In some embodiments, the dyeing contact period is about 1 second to 30 minutes, or about 10 seconds to 30 minutes, or about 10 seconds to 25 minutes, or about 10 seconds to 20 minutes, or about 10 seconds to 15 minutes, or about 10 seconds to 10 minutes, or about 10 seconds to 5 minutes, or about 10 seconds to 3 minutes, or about 10 seconds to 2 minutes, or about 10 seconds to 1 minute, or about 10 seconds to one second, or about one minute to one second. In some embodiments, the contacting is carried out at ambient laboratory or manufacturing conditions. In some embodiments, the contacting is carried out at a temperature (bath temperature, fiber temperature, or both) of about 20° C. to 100° C., about, 20° C. to 80° C., about 20° C. to 60° C., about 20° C. to 40° C., about 20° C. to 30° C., about 100° C. to 80° C., about 100° C. to 50° C., or about 25° C. to 30° C.

In some embodiments, after the contacting, a pre-dyed fiber is obtained. The pre-dyed fiber is not characterized by the blue range of color conventionally associated with indigo. The pre-dyed fiber comprises at least 0.1 weight percent of O,O'-diacetyl leucoindigo based on the starting weight of the fiber (% weight of fiber, or % wof). In some embodiments the pre-dyed fiber comprises as much as 20% wof of O,O'-diacetyl leucoindigo. In some embodiments the pre-dyed fiber comprises O,O'-diacetyl leucoindigo in an amount corresponding to about 0.1% wof to 4% wof; about 1% wof to 4% wof; about 0.5% wof to 5% wof; about 4% wof to 10% wof; about 5% wof to 15% wof; or about 10% wof to 20% wof. The pre-dyed fiber is suitably washed with water, a water-miscible solvent, or a mixture thereof prior to proceeding to the developing step; however, such an intermediate washing step is optional and is often excluded. The pre-dyed fiber is suitably compressed, such as by wringing, squeezing, or nipping, prior to proceeding to the developing step to reduce the amount of solvent, dissolved O,O'-diacetyl leucoindigo, or both associated with the pre-dyed fiber; however, such compression is optional and is suitably excluded in one or more embodiments.

Developing the pre-dyed fiber results in formation of an indigo-dyed fiber, that is, a fiber comprising indigo. Developing comprises, consists essentially of, or consists of contacting the pre-dyed fiber with one or more reagents that causes hydrolysis or oxidation of O,O'-diacetyl leucoindigo, cleaving the acetyl moieties from the molecule. Hydrolysis or oxidation is rapidly followed by rearrangement of the molecule to form indigo, along with formation of the characteristic visible blue color range associated with the indigo molecule. In some embodiments, developing is hydrolyzing. In some embodiments, hydrolyzing is accomplished by contacting the pre-dyed fiber with an alcoholic alkaline solution. Thus, In some embodiments, the developing bath comprises, consists essentially of, or consists of an aqueous alkaline solution. In other embodiments developing is oxidizing. In some embodiments, oxidizing comprises, consists essentially of, or consists of contacting the pre-dyed fiber with air, with an oxidizing agent such as a dichromate, or both. In some embodiments the pre-dyed fiber is contacted with a developing bath comprising an oxidizing agent. In some embodiments, developing is a combination of hydrolyzing and oxidizing, depending on the developing compounds employed by the user.

In some embodiments, developing is immersing the pre-dyed fiber in the developing bath. In some embodiments, developing is saturating the pre-dyed fiber with the developing bath. In some embodiments, developing is impregnating, spraying, foaming, coating, padding, or any other suitable technique for contacting the developing bath with the pre-dyed fiber. In some embodiments, the ratio of developing bath weight:pre-dyed fiber weight is about 1:1 to 100:1, for example about 1:1 to 50:1, or 2:1 to 50:1, or 5:1 to 50:1, or 10:1 to 50:1, or 20:1 to 50:1, or 30:1 to 50:1, or 40:1 to 50:1, or 1:1 to 40:1, or 1:1 to 30:1, or 1:1 to 20:1, or 1:1 to 10:1, or 1:1 to 7:1, or 1:1 to 5:1, or 1:1 to 2:1. In some embodiments, the developing is for a developing contact period of at least about 1 second. One of skill in the art understands that the developing contact period is determined by the user, depending upon of the surface area and physical characteristics of the pre-dyed fiber and method of contacting the pre-dyed fiber with the developing bath or developing agent. In some embodiments, the developing contact period is about 1 second to 30 minutes, or about 10 seconds to 30 minutes, or about 10 seconds to 25 minutes, or about 10 seconds to 20 minutes, or about 10 seconds to 15 minutes, or about 10 seconds to 10 minutes, or about 10 seconds to 5 minutes, or about 10 seconds to 3 minutes, or about 10 seconds to 2 minutes, or about 10 seconds to 1 minute, or about 10 seconds to one second, or about one minute to one second. In some embodiments, the developing contacting is carried out at ambient laboratory or manufacturing conditions. In some embodiments, the developing contacting is carried out at a temperature (developing bath temperature, fiber temperature, or both) of about 20° C. to 50° C., about 20° C. to 40° C., about 20° C. to 30° C., or about 25° C. to 30° C.

In some embodiments, the developing comprises, consists essentially of, or consists of saturating a pre-dyed fiber with a basic alkanol solution. In some embodiments, the developing comprises, consists essentially of, or consists of immersing a pre-dyed fiber in a basic alkanol solution. In some embodiments the basic alkanol solution comprises one of sodium hydroxide, potassium hydroxide, or a mixture thereof. In some embodiments the basic alkanol solution is 0.01M to 0.05 M sodium and/or potassium hydroxide, or 0.02M to 0.05M, or 0.03M to 0.05M sodium and/or potassium hydroxide. In some embodiments the alkanol is methanol, ethanol, isopropanol, or a mixture of two or more thereof. In some embodiments the developing bath further includes an amount of water, for example about 1 wt % to 20 wt % water, or about 2 wt % to 15 wt % water, or about 3 wt % to 10 wt % water. In some embodiments, the developing bath comprises, consists essentially of, or consists of 0.03M sodium hydroxide dissolved in 95% ethanol. In some embodiments developing bath comprises a pH of 7 to 12, or 8 to 11 or 9 to 12 or 9 to 11 or 8 to 10 or 9 to 10.

During the developing, an observer will observe that the pre-dyed fiber obtains a characteristic blue color range closely associated with indigo dye. The color development is indicative of the formation of indigo and so may be used as a visible marker of the extent of the developing reaction. When color has stopped changing, developing is complete or is substantially complete. While not all of the O,O'-diacetyl leucoindigo must be converted to indigo to provide a suitable color in the dyed fiber, it is economically efficient to drive the developing reaction close to completion, such as to at least 90% molar yield of indigo from O,O'-diacetyl leucoindigo, such as 90% to 100%, 95% to 100%, 96% to 100%, 97% to 100%, 98% to 100%, or 99% to 100% yield of indigo on a molar basis.

In some embodiments, the contacting followed by developing represents a dye cycle, wherein the dyeing process comprises at least one dye cycle. In some embodiments, two or more dye cycles comprising repeating the contacting and the developing in alternating fashion. In some embodiments the dyeing process comprises 2 to 30 dye cycles, for example 2 to 20 dye cycles, 5 to 10 dye cycles, 7 to 8 dye cycles, 5 to 8 dye cycles, 2 to 5 dye cycles, or 1, 2, 3, 4, 5, 6, 7, 8, 9, 10, 11, 12, 13, 14, 15, 16, 17, 18, 19, 20, or more dye cycles. In some embodiments, the two or more dye cycles are carried out employing a single dye bath and a single developing bath, wherein a fiber is immersed in or saturated with the baths in alternative fashion. In other embodiments, two or more dye baths, two or more developing baths, or both are contacted with a fiber. For example, In some embodiments a different dye bath is used in each cycle. In some embodiments a different developing bath is used in each cycle. In some embodiments the two or more baths are arranged serially, wherein a continuous length of fiber, textile, or fabric proceeds along a web-type industrial dyeing path and is contacted alternatively with one or more dye baths and one or more developing baths, providing one or more dye cycles as the web proceeds in a single direction.

In some embodiments where more than one dye bath is employed the dye baths are individually selected to include an amount of O,O'-diacetyl leucoindigo corresponding to 1% wof to 10% wof, or 2% wof to 7% wof, or 2% wof to 5% wof, or 2% wof to 4% wof, or 3% wof to 5% wof, or 2% wof to 3% wof. In some embodiments where more than one dye bath is employed in a dyeing process, for example first dye bath, second dye bath, third dye bath, fourth dye bath, fifth dye bath, sixth dye bath, seventh dye bath, or higher, the dye baths have substantially the same concentration of O,O'-diacetyl leucoindigo in some embodiments; in other embodiments, variable concentration of O,O'-diacetyl leucoindigo is employed in two or more serially arranged dye baths. In some embodiments, the one or more dye baths are replenished with O,O'-diacetyl leucoindigo during one or more continuous dyeing processes. In some embodiments, the one or more dye baths are replenished with O,O'-diacetyl leucoindigo between batch processes. The skilled artisan desiring a particular shade of color in connection with a particular type of fiber will understand that the processes described herein are suitably varied to incorporate a range of easily tailorable conditions to obtain the targeted outcome.

In some embodiments, additional O,O'-diacetyl leucoindigo is added to one or more dye bath, either to darken the dyed fiber shade, or to replenish the dye bath as pre-dyed fibers exhaust the supply of O,O'-diacetyl leucoindigo. In some embodiments, previously dyed fibers are re-dyed to achieve darker shades without the risk of stripping indigo (as in conventional vat dyeing) already deposited on the fabric.

In some embodiments, the dyeing process includes rinsing with a solvent. Rinsing is suitably carried out after developing; where more than one dye cycle is employed rinsing is suitably carried out after any one or more developing steps. In some embodiments, residual alkaline content is removed from the fiber by rinsing with a solvent. The solvent is, in various embodiments, water, a water miscible solvent, or a mixture thereof, optionally further including one or more surfactants, detergents, hydrotropes, or a combination thereof. In some embodiments, the water is fresh water, tap water, deionized water, softened tap water, or purified water. In some embodiments, the temperature of the rinse solvent is between about 15° C. and 100° C., such as 15° C. to 80° C., or 15° C. to 60° C., or 15° C. to 40° C., or 15° C. to 30° C. In some embodiments, rinsing has a colorimetric effect on the indigo-fiber combination, such that different shades are observed to form e.g. when a fiber is rinsed vs. not rinsed, or rinsed with water vs. e.g. an alkanol. In some embodiments, steps in the order of contacting-developing-rinsing are repeated until the desired shade is achieved. In some embodiments the steps in the order of contacting-developing-rinsing are repeated two to 30 times, or 2 to 20 times, or 5 to 10 times, or 2 to 5 times. In other embodiments, multiple dye cycles are followed by a single rinsing step: that is, multiple dye cycles as recited above followed by a single rinsing.

In some embodiments, a final washing is optionally conducted after the last developing step is completed, optionally after a final rinsing. In some embodiments, the final washing is separate and distinct from the one or more rinsing steps; in other embodiments, the final washing is also a rinsing. In some embodiments, washing is with water or water plus one or more washing additives, wherein the washing is carried out between 0° C. and about 100° C. In some embodiments the washing additive is selected from one or more surfactants, hydrotropes, detergents, enzymes, water miscible solvents as defined elsewhere herein, or a mixture of two or more thereof. In some embodiments, the dyed fiber or textile is dried after the washing. In some embodiments, the drying is accomplished using heat, forced air flow, or a combination thereof. The dry, dyed fiber is suitably analyzed for color, color uniformity, color fastness, suitability of the dyed fiber for subsequent use in one or more manufacturing applications such as clothing manufacture, or a combination of two or more thereof. In some embodiments, the dyed fiber or fabric is further dyed with one or more additional dyes to produce additional colors.

Dyed Fibers, Textiles, and Fabrics

The dyeing compositions and processes described herein result in substantially uniform indigo dye distribution, and substantially uniform dyed color throughout a dyed fiber, textile, or fabric. The dyed fibers comprise indigo. In some embodiments, the dyeing compositions and processes described herein provide an indigo dyed fiber, textile, or fabric that is substantially uniformly dyed as determined by L*, a*, and/or b* color measurements employing a standard illuminant. As a term of art, d50 LAB denotes the L*a*b* value relative to CIE standard illuminant D50.

In some embodiments, employing the dyeing compositions and processes described herein, cellulose fibers are dyed to dark indigo shades. Cellulose is the fiber type principally addressed in conventional leucoindigo-based dyeing processes. However, the present compositions and dyeing processes result in indigo dyed cellulose fibers having a darker indigo color, after a single dyeing cycle, than the same cellulose fibers after a single conventional leucoindigo-based dyeing cycle. In some embodiments, a single dyeing cycle employing the present compositions and dyeing processes result in indigo dyed cellulose fibers having a darker indigo color than the same cellulose fibers after a two conventional leucoindigo-based dyeing cycles, or three such cycles, or four such cycles, or five such cycles, or six such cycles, or seven such cycles. In some embodiments, the fiber comprises cellulose further blended with another type of polymer, intimately as a polymer blend or alloy, or by contacting different types of discrete fibers together during formation of a textile or a fabric.

In some embodiments, employing the dyeing compositions and processes described herein, polyester fibers are dyed to dark indigo shades. Polyester fibers are not suitable for indigo dyeing using the conventional leucoindigo-indigo dyeing process. In some embodiments the polyester is an aromatic polyester comprising a polyalkylene terephthalate, polyalkylene naphthalate, or one or more copolymers thereof. In some embodiments the polyester is an aliphatic polyester or copolyester comprising one or more lactate, glycolate, alkanoate, adipate, succinate, or valerate moieties. In some embodiments, the fiber comprises one or more polyesters further blended with another type of polymer, intimately as a polymer blend or alloy, or by contacting different types of discrete fibers together during formation of a textile or a fabric.

When a derivative of indigo—N,N'-diacetyl indigo—was used in the dyeing process described herein in place of O,O'-diacetyl leucoindigo, polyester and cotton fibers failed to achieve dark indigo shades and instead produced lighter shades compared to the dyeing process described herein and employing O,O'-diacetyl leucoindigo.

In some embodiments, employing the dyeing compositions and processes described herein, polyacrylonitrile (PAN) fibers are dyed to intense blue shades. Polyacrylonitrile (PAN) fibers are not suitable for indigo dyeing using the conventional leucoindigo-indigo dyeing process. In some embodiments, the fiber comprises PAN blended with another type of polymer, intimately as a polymer blend or alloy, or by contacting different types of discrete fibers together during formation of a textile or a fabric.

In some embodiments, employing the dyeing compositions and processes described herein, cellulose acetate, rayon, wool, nylon 6, nylon 6,6 or blends thereof and/or blends of one or more thereof with cellulose, polyester, PAN, or a combination thereof are suitably dyed employing the dyeing processes and compositions described herein.

In some embodiments, the dyeing compositions and process describe herein are used to dye hair fibers (e.g. human hair).

Accordingly, described herein is a dyed fiber comprising or consisting essentially of a fiber and indigo. In some embodiments the fiber is a textile fiber. Also described herein is a dyed textile, the dyed textile comprising or consisting essentially of, or consists of indigo pigment and a woven or nonwoven assembly of textile fibers. In some embodiments the indigo pigment is substantially uniformly distributed on the surface of the dyed fiber, within the dyed fiber, or both. In some embodiments the indigo is substantially uniformly distributed on the dyed fiber, textile, or fabric such that the L*a*b* color value thereof varies less than about 20%, for example less than 15%, 12%, 10%, or 5% in any one or more of L*, a*, and b* values between any two selected location on a dyed fiber. Also described herein is a pre-dyed fiber comprising or consisting essentially of a fiber and O,O'-diacetyl leucoindigo. In some embodiments, the pre-dyed fiber, the dyed fiber, or both comprise one or more polymers comprising cellulose, cellulose acetate, polyester, polyamide, polyacrylonitrile, or a blend of two or more thereof. In some embodiments, the dyed fiber is obtained by the dyeing process described herein.

In some embodiments, disclosed herein is an indigo dyed fiber excluding or substantially excluding cellulose or a derivative thereof.

In some embodiments, disclosed herein is the use of O,O'-diacetyl leucoindigo to obtain an indigo dyed fiber. In some embodiments, the fiber comprises one or more polymers comprising cellulose, cellulose acetate, polyester, polyamide, polyacrylonitrile, or a blend of two or more thereof. In some embodiments, the indigo dyed fiber excludes or substantially excludes cellulose or a derivative thereof. The use encompasses any combination of compositions and methods described herein without limitation as all embodiments as described are suitably selected to work together to achieve indigo dyed fibers, further subjected to the personal skill and artistic evaluation of the operator to achieve the desired indigo shade. The compositions and methods described herein are intended to be combined without limitation: each and every embodiment described herein is suitably combined with another embodiment, and each and every embodiment works in combination or alone to obtain indigo dyed fibers, further subjected to the personal skill and artistic evaluation of the operator to achieve the desired indigo shade.

In the nonlimiting examples set forth below, test fabrics according to the dyeing process described herein that are substantially white prior to dyeing obtain values of L* between 50 and 80, a* values between 0 to −5, and b* values between 0 to −25 after one or more dyeing cycles according to the processes and compositions described herein.

The dyed fibers and textiles in some embodiments are suitably employed in applications such a consumer clothing (e.g. interior fabrics, accessories, wearables), where intense and vibrant colors are desirable. Indigo affixed onto textile fibers by the dyeing process is durable to standard consumer washing and drying activities such as washing machine washing with agents such as fabric detergents and fabric softeners and drying in heated forced air conditions. In some embodiments, fibers dyed using O,O'-diacetyl leucoindigo in conjunction with the processes and compositions described herein retain about 50% to 99% of the original weight of indigo applied to the fiber as measured at the end of the dyeing process.

In some embodiments, the O,O'-diacetyl leucoindigo can be applied to human hair by any suitable method. In some embodiments the O,O'-diacetyl leucoindigo is in powder or granular form. In some embodiments, the O,O'-diacetyl leucoindigo is applied as a paste and rubbed into the hair and allowed to sit for any suitable time before rinsing to obtain the desired hair color.

EXPERIMENTAL

Example 1

Equal masses of indigo (1.1 g, 4.2 mmol) and zinc dust (1.1 g, 16.8 mmol) were suspended in 35 mL acetic anhydride with vigorous stirring; no heat was added. Stirring was continued for 2 hours to result in a opaque gray-blue mixture. Then the contents of the flask were poured into an approximately equal volume of water, and 25 mL of 1M HCl was added to the water upon which a mild effervescence was observed. Vigorous stirring was continued for 30 minutes, after which a gray solid was collected and washed several times with water, then washed with 1M HCl to remove residual zinc. The washed solid was dried to obtain O,O'-diacetyl leucoindigo in >90% yield as a gray powder. If desired, further purification can be achieved by recrystallization or silica gel column chromatography using acetone as the solvent

Example 2

Lab scale beaker dyeing was conducted using O,O'-diacetyl leucoindigo obtained in Example 1. Results are shown in Table 1. A dye bath was formed having 95% ethanol and the desired amount (% weight-on-fiber, or % wof) of O,O'-diacetyl leucoindigo, further adjusting the ratio of dye bath volume to the mass of the fabric sample to be dyed (liquor ratio) to be approximately 20:1. The dye bath was stirred without heating until dissolution was complete. Dyeing was carried out by immersing the textile sample in the dye bath for several seconds to a few minutes as selected, to form a pre-dyed fabric. The pre-dyed fabric was removed from the dye bath with minimal agitation, and immediately transferred to a second beaker containing in ~0.03M NaOH in 95% ethanol. Upon immersing the fabric in the alkali solution, blue to purple color was observed to form. The fabric sample was allowed to remain immersed until the color was observed to stop changing (several minutes). Then the fabric was removed from the alkali solution and washed with tap water; in some cases, the fabric was then reintroduced into the dye bath without drying, and one or more additional cycles of dyeing, developing, and washing were carried out, as indicated in Table 1. The dye-develop-wash cycle was repeated until the desired shade was reached, then the fabric was allowed to air dry. CIELAB colorspace of the dry dyed fabric was analyzed by comparison to the d50 standard. Results using various fabrics, targeted % wof, and number of dye-develop-wash cycles are shown in Table 1.

Additional O,O'-diacetyl leucoindigo was added to the dye bath as needed to increase % wof or to replenish O,O'-diacetyl leucoindigo in preparation for a subsequent dye-develop-wash cycle. In some cases, the dye bath, the developing bath, or both obtained observable purple or blue hues as two or more dye-develop-wash cycles resulted in an amount of indigo deposited in one or both of the baths; however, this color development was not observed to affect the dyeing or the developing processes.

TABLE 1

Test fabrics dyed, dye bath % wof, and observations related to the dyeing process of Example 2.

| Fabric, Source | O,O'-diacetyl leucoindigo targeted % wof | D50LAB Color Space of Dyed Textile | Other Observations-Dyed textile |
| --- | --- | --- | --- |
| Cellulose | 4% | One cycle: L = 51.3; a = −5.2; B = −13.2 Two cycle re-dye: L = 35.8; a = −2.2; b = −12.5 | dark indigo shades |
| Polyester: Texturized Polyester Interlock Knit Fabric (Disperse Dyeable) basis weight approx. 106 g/meter²; obtained from Testfabrics Inc. of W. Pittston PA | 3% | L = 49.0; a = −3.2; b = −15.9 | dark indigo shades |
| Polyacrylonitrile: Acrylic 1310006 ORLON ®, Type 75 Spun, Plain Weave, Iso 105-F05, basis weight approx. 140 g/meter²; obtained from Testfabrics Inc. of W. Pittston | 3.5% | L = 69.7; a = −5.5; b = −13.0 | pure blue shades |
| Wool: 1417003 Wool Jersey Knit Fabric, basis weight approx. 177 g/meter²; obtained from Testfabrics Inc. of W. Pittston PA | 2.5% | L = 68.6; a = −5.1; b = −7.8 | light blue-grey shades |
| Rayon: TENCEL ® TJ20MA 100% Micro TENCEL ® Bleach PFD, Jersey knit, yield 8.00-8.50, obtained from Laguna Fabrics of Vernon, CA | 2% | L = 72.0; a = −5.3; b = −7.5 | blue-grey shades |
| Acetate: 1401002 Acetate Tricot All Delustered Filament, basis weight approx. 78 g/meter²; obtained from Testfabrics Inc. of W. Pittston PA | 5% | L = 55.1; a = −3.1; b = −16.0 | pure blue shades but fabric is degraded by the dyeing conditions |

TABLE 1-continued

Test fabrics dyed, dye bath % wof, and observations
related to the dyeing process of Example 2.

| Fabric, Source | O,O'-di-acetyl leuco-indigo targeted % wof | D50LAB Color Space of Dyed Textile | Other Observations-Dyed textile |
|---|---|---|---|
| Nylon 6,6: Semi-Dull Taffeta, Scoured, Heat Set, basis weight approx. 59 g/meter$^2$; obtained from Testfabrics Inc. of W. Pittston PA | 4% | L = 81.8; a = −11.1; b = −9.5 | light blue shades |

Example 3

Water (75 mL) was heated to 50° C. and adjusted to pH 11.5 via the addition of 5% NaOH(aq) before liquid dispersant (CEKASPERSE 3600, 0.5% OWG) was added. Then O,O'-diacetyl leucoindigo (20 mg, as prepared in Example 1) was added to the water-dispersant mixture with minimal agitation, forming a cloudy mixture. The mixture began to appear blue within about five minutes. Sodium dithionite (20 mg) was added gradually, upon which the mixture took on the characteristic yellow/green appearance of a reduced indigo vat.

Example 4

A temperature controlled dyebox at 25° C. in a Roaches Skypad dyeing range was prepared by adding 1.4 L of water, 2.1 g sodium dithionite and 4 mL 27% NaOH. A stock vat is prepared with P40 wetting agent (0.5 g/L final conc.), CEKASPERSE 3600 (2 g/L final conc.), SEYDEL FES Conc. sequestering agent (1 g/L final conc.), 75 mL 27% NaOH and 1 g sodium dithionite. The O,O'-diacetyl leucoindigo (3.1 g as powder, 2 g/L final conc.), is added to the stock vat at 40° C. and stirred by hand to disperse the O,O'-diacetyl leucoindigo. The stock vat is added to the dyebox in the range, and if needed pH is adjusted via addition of 4M HCl to achieve the desired value (10.5-11.0). To keep the dyeboxes in a state of reduction, additional sodium dithionite may be added to maintain the reduction potential between −760 to −860 mV as measured with a Rosemount Analytical ORP/Analyzer.

Cotton yarn (mercerized, 20/2) that has been collected into a rope (35 to 40 ends) is fed into the Skypad range and is first passed through the dyebox at a rate of 5 m/min. The rope is squeezed through a nip mangle after emerging from the dyebox to remove excess solution. Following each dip, the ropes are exposed to open air for at least 30 seconds, which is known as "skying," to allow for oxidation of the dye. The rope enters and exits the dyebox until the desired shade is achieved (typically 6-8 cycles) each time being squeezed to ensure at least 70% wet pickup when entering the dyebox for the next cycle. When dyeing is complete, the rope is subjected to a cold water rinse followed by a warm water rinse to remove non-fixed dye before being air dried and coiled in finished form. These rinses can also be conducted using dyeboxes on the range if desired.

What is claimed is:

1. A method of dyeing a fiber, the method comprising:
   (a) contacting the fiber with a dye bath to form a pre-dyed fiber, the dye bath comprising O,O'-diacetyl leucoindigo and a solvent comprising alkanols, glycols, glycol ethers, glycol esters, carbitols, hydrotropes, or mixtures thereof; and
   (b) developing the pre-dyed fiber to form a dyed fiber, wherein developing comprises contacting the pre-dyed fiber with one or more reagents to hydrolyze or oxidize the O,O'-diacetyl leucoindigo.

2. The method of claim 1, wherein (a) and (b) is a dye cycle repeated at least one time.

3. The method of claim 2, wherein the dye cycle is repeated two or more times in order.

4. The method of claim 1 further comprising step (c) rinsing the dyed fiber.

5. The method of claim 1 wherein the contacting is for 1 second to 30 minutes.

6. The method of claim 1, wherein the contacting is at a temperature of 20° C. to 50° C.

7. The method of claim 1, wherein the dye bath comprises water, a dispersant or surfactant, wherein the pH of the dye bath is greater than 7.

8. The method of claim 1, wherein the the alkanol comprises C1-C6 alkanols.

9. The method of claim 1, wherein the dye bath comprises a weight ratio of 1 part O,O'-diacetyl leucoindigo to 2 to 1000 parts solvent.

10. The method of claim 1, wherein the developing is immersing for 1 second to 30 minutes.

11. The method of claim 10, wherein developing is at a temperature of 20° C. to 50° C. during the immersing.

12. The method of claim 1, wherein the developing is contacting the pre-dyed fiber with a solution comprising an hydroxide and ethanol.

13. The method of claim 1, wherein the fiber comprises a polyamide, a polyester, a cellulose, a cellulose acetate, a hemicellulose, a polyacrylonitrile, a cotton, a wool, a silk, or blends or copolymers of two or more thereof.

14. The method of claim 1, wherein the fiber comprises hair.

15. A pre-dyed fiber comprising a fiber and 0,0-diacetyl leucoindigo.

16. The pre-dyed fiber of claim 15, wherein the fiber comprises a polyamide, a polyester, a cellulose, a cellulose acetate, a hemicellulose, a polyacrylonitrile, a cotton, a wool, a silk, or blends or copolymers of two or more thereof.

17. The pre-dyed fiber of claim 15, wherein the dyed fiber comprises a fiber and indigo, wherein the fiber excludes cellulose or a derivative thereof.

18. An assembled plurality of dyed fibers according to claim 16, wherein the assembly is a textile or a fabric.

19. The method of claim 1, wherein the dyed fiber comprises hair and indigo.

20. A kit for dyeing fiber, the kit comprising O,O'-diacetyl leucoindigo in substantially solid form; and directions for dyeing a fiber using the O,O'-diacetyl leucoindigo.

* * * * *